United States Patent

Dimmick

[15] 3,689,896

[45] Sept. 5, 1972

[54] TIME DIVISION SWITCHING SYSTEM

[72] Inventor: James Owen Dimmick, Boulder, Colo.

[73] Assignee: Bell Telephone Laboratories, Incorporated, Murray Hill, N.J.

[22] Filed: Dec. 21, 1970

[21] Appl. No.: 100,146

[52] U.S. Cl. ..........................340/172.5, 179/15 AA

[51] Int. Cl. ..............................................H04j 7/00

[58] Field of Search...340/172.5; 179/15 AA, 15 AP, 179/15 AT, 18 ES, 18 J

[56] References Cited

UNITED STATES PATENTS 3,134,856 5/1964 Jorgensen............179/15 AA

*Primary Examiner*—Raulfe B. Zache

*Attorney*—R. J. Guenther and James Warren Falk

[57] ABSTRACT

In a time division switching system, signals are exchanged between a pair of selected storage devices in a distinct time slot by means of opposite type pulses applied to the selected storage devices. The signal output of each storage device is sampled at the beginning of a distinct time slot and the sampled output of one selected storage device is compared to the continuously monitored output of the other selected storage device. When the sampled output of the one selected storage device is equal to the continuously monitored output of the other selected storage device, the pulse applied to the other selected storage device is terminated whereby signals are transferred between the selected storage devices.

15 Claims, 7 Drawing Figures

INVENTOR
J. O. DIMMICK
BY J S Cubert
ATTORNEY

TIME DIVISION SWITCHING SYSTEM

BACKGROUND OF THE INVENTION

My invention relates to signal transfer systems; more particularly to time division switching systems employing active energy transfer arrangements; and more particularly to such asynchronous time division switching systems wherein feedback control of time slot duration is employed.

Time division switching systems permit simultaneous exchange of information between selectively connected active terminals over a common communication link. Each information exchange between a pair of terminals occurs in a selected recurring interval or time slot of a repetitive group of time slots. During each scan of the time slot group, pairs of active terminals are connected in sequence to the common link in preassigned sequential time slots. In one time slot a channel is provided between a pair of selected terminals; the information at each terminal assigned to the connection is sampled; and the sampled information is exchanged between the selected terminals over the common link. The common link is available to other connections during the remaining time slots of the scan. As is well known in the art, the sampling rate may be selected to provide an accurate transfer of signals between selectively connected terminals.

In generally known time division switching systems, the time slots are of fixed duration regardless of the quantity of energy exchanged between connected terminals. The time slot duration is selected to allow the transfer of the maximum expected energy. Where speech and other types of audio signals are transferred between active terminals, it is known that the amount of energy transferred in a time slot is variable and that the maximum energy transfer is required only during a very small number of time slots. In a speech connection, for example, a terminal pair may be silent for a considerable portion of the conversation time. Thus, the average amount of speech energy exchanged during the fixed time slot period is much smaller than the maximum energy. Consequently, a time division switching arrangement utilizing constant duration time slots is not used in an efficient manner.

The communication link between active terminals comprises a plurality of high speed switches, each of which has a finite resistance that contributes to the attenuation of the energy being transferred. In resonant energy transfer multiplex arrangements, the switch resistance may result in appreciable signal losses. Some priorly known time division switching systems include an amplifier arrangement which operates to provide additional energy during the information transfer to offset switch losses. The amplifier arrangement, however, usually results in greater equipment complexity and the addition of further controls.

The aforementioned difficulties have been overcome in a time division switching system wherein the time slot duration is not fixed but varies in accordance with the actual energy exchange and wherein constant current signals are employed to minimize switching losses. Such a time division switching system is disclosed, for example, in the the J. O. Dimmick et al U. S. Pat. No. 3,629,839 issued Dec. 21, 1971 and assigned to the same assignee. In this type of time division switching arrangement, there are first and second groups of storage devices and each first and second group storage device is selectively connectable to a respective one of first and second common buses. During a time slot, the signals from a selected first group storage device and a selected second group storage device are applied to their respective common buses and the signals are coupled therefrom to a timing circuit that produces a pulse having a duration corresponding to the difference between the sampled signals. In response to the timing circuit pulse, one of first and second polarity constant current signals is applied to the selected first group storage device and the other of said first and second polarity constant current signals is applied to the selected second group storage device for the duration of the timing circuit pulse. The timing circuit pulse duration is determined independently of the signals being applied to the selected storage devices since the pulse duration corresponds to the initial sampled signal difference. In such a variable duration time slot arrangement, errors in the duration of the timing circuit pulse caused by deviations in circuit parameters or mismatches between the constant current signals applied to the selected storage devices may result in distortion of the exchanged signals.

BRIEF SUMMARY OF THE INVENTION

My invention is a time division switching system that includes a plurality of storage devices and a plurality of time slots occurring in repetitive cycles. During the initial portion of each time slot, the signals on a selected pair of storage devices are sampled. In response to the polarity of the sampled signal difference, one of the first and second type signals is applied to one of the selected pair of storage devices and the other of first and second type signals is applied to the other of said selected pair of storage devices. The signals on each of the selected pair of storage devices is also monitored during the distinct time slot. The duration of the signal applied to each one storage device of the selected pair is controlled by the difference between the sampled signal from the other selected storage device and the monitored signal from said one storage device.

According to one aspect of my invention, the plurality of storage devices are divided into first and second groups. During the initial portion of a distinct time slot, the signal on a selected first group storage device and the signal on a selected second group storage device are sampled and the sampled signal from the selected first group storage device is applied to a first common bus while the sampled signal from the selected second group storage device is applied to a second common bus. The polarity of the sampled signal difference causes a first polarity signal to be applied to said first bus and a second polarity signal to be applied to said second bus. The output of the selected first group storage device and the output of the selected second group storage device are continuously monitored during the time slot on third and fourth buses, respectively. The duration of a signal applied to the selected first group storage device is controlled by the difference between the sampled signal from the selected second group storage device on the second bus and the continuously monitored signal from the selected first group storage device on the third bus. The duration of the signal applied to the second group storage device is controlled by the difference between the sampled signal from the selected first group storage device on said first bus and the monitored signal from the selected second group storage device on the fourth bus.

According to another aspect of my invention, the sampled signal from one selected storage device is stored and the stored sample signal is compared to the continuously monitored signal from the other selected storage device. The signal applied to the other selected storage device is terminated when the stored sampled signal from the other selected storage device is equal to the continuously monitored signal from the one selected storage device.

According to an illustrative embodiment of the invention, each of a plurality of stations is selectively connectable to a first common bus via a sampling gate and a filter including a storage capacitor; and each of a plurality of lines or trunks is selectively connectable to a second common bus via a sampling gate and a filter including a storage capacitor. A store includes a plurality of cells each containing the addresses of a station trunk pair. A control circuit includes a selection decoder which receives the station and trunk addresses from a selected cell in each time slot and is operative to connect a selected station to the first common bus and a selected trunk to the second common bus in one of a group of time slots occurring in repetitive cycles. A third common bus is also connected to the selected station and a fourth bus is also connected to the selected trunk during the time slot.

In the first portion of the time slot, the selected station and the selected trunk are addressed, and the voltages on the selected station and trunk storage capacitors are sampled and transferred to storing circuits via said first and second common buses. The polarity of the difference between the storing circuit voltages is detected and a first polarity constant current signal is applied to the selected station storage capacitor and a second polarity constant current signal is applied to the selected trunk storage capacitor. The duration of the constant current signal applied to the selected station storage capacitor is controlled by comparing the stored sample voltage of the selected trunk storage capacitor with the continuously monitored signal obtained from the selected station storage device via the associated third common bus. When the selected trunk stored sample signal is equal to the selected station monitored signal, the constant current signal applied to the selected station storage capacitor is terminated. In like manner, the selected trunk storage capacitor is charged to the stored sampled signal voltage on the selected station storage capacitor. In this way, the constant current signal applied to each storage device is compared to the initially sampled signal from the other storage device whereby the signals are exchanged between the selected station and trunk on a time division basis.

Upon the termination of both constant current signals in response to the feedback comparisons, the sampling gates associated with each selected storage capacitor are closed and the four common buses are connected to a ground reference potential whereby the residual voltages on the common bus are removed. A new time slot is then initiated in which a second station and a second trunk are connected to the common bus in accordance with the contents of the next memory cell of the store.

In accordance with the invention, the duration of the constant current signal applied to each selected storage capacitor is controlled by comparing the signal voltage on the one storage capacitor with the initially sampled signal voltage from the other storage capacitor whereby the signal applied to the one storage capacitor is terminated when the signal voltage on the storage capacitor is equal to the initially sampled signal voltage on the other storage capacitor. In this way, a sampled signal from the other storage capacitor is transferred to the one storage capacitor without distortion.

DETAILED DESCRIPTION

Figure 1:
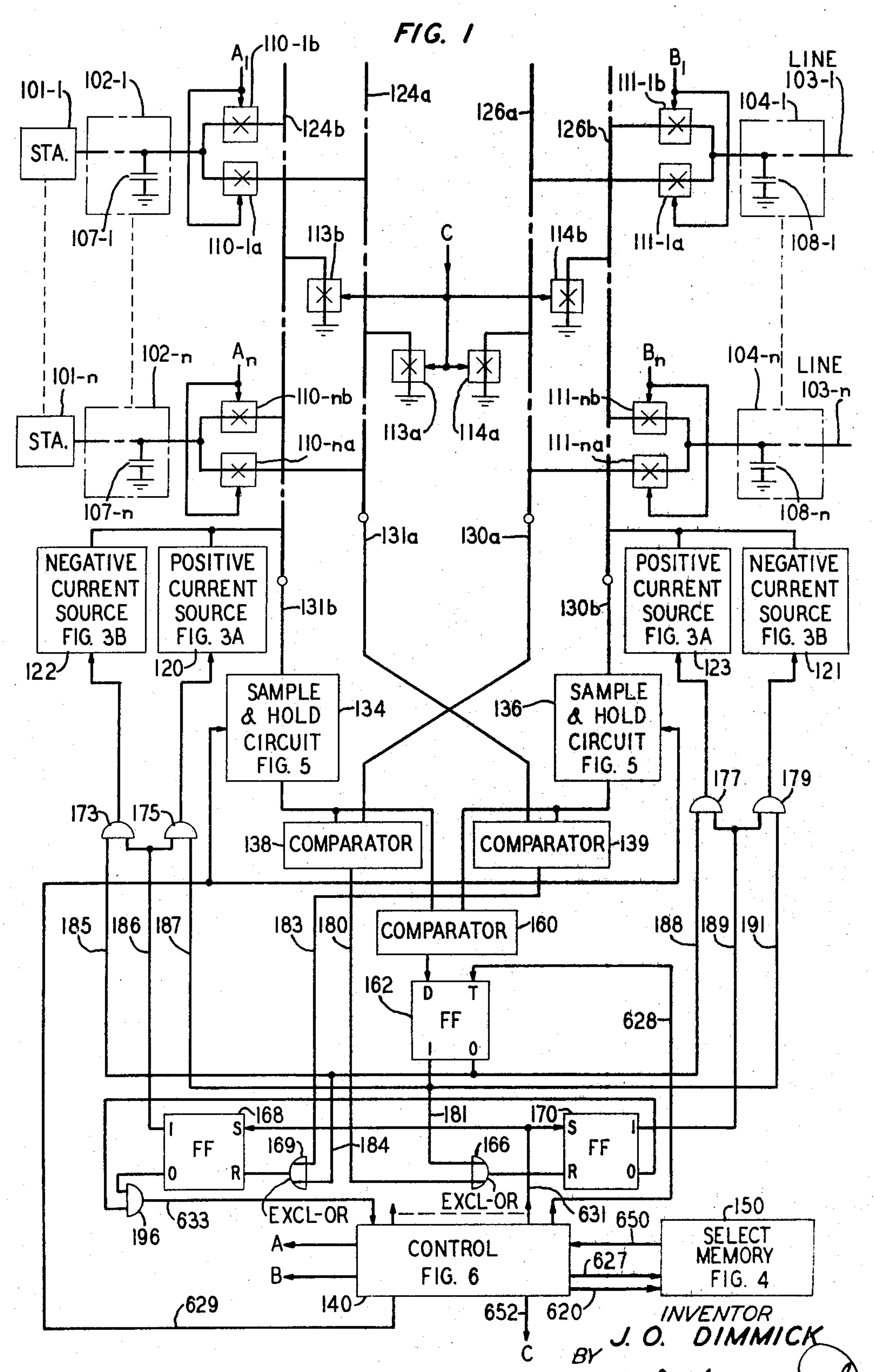
FIG. 1 depicts an illustrative embodiment of the invention.

Referring to FIG. 1, stations 101–1 through **101–*n* are connected to filter circuits 102–1 through 102–*n*. Each of these filter circuits includes one of storage capacitors 107–1 through 107–*n*. These storage capacitors are selectively connectable to common bus 124*a* via sampling gates 110–1*a* through 110–*na* and to common bus 124*b* via sampling gates 110–1*b* through 110–*nb*. Lines or trunks 103–1 through 103–*n*** *are connected to filter circuits 104–1 through 104–n respectively. Each of these filter circuits includes one of storage capacitors 108–1 through 108–n* and these storage capacitors are selectively connectable to common bus **126*a* via sampling gates 111–1*a* through 111–*na* and to common bus 126*b* via sampling gates 111–1*b* through 111–*nb*. The sampling gates are controlled by control 140 so that a selected station storage capacitor and a selected line storage capacitor are connected to their respective common buses in a distinct time slot. The active stations and lines are connected in sequentially occurring time slots in accordance with the arrangement of select memory 150. Select memory 150** is sequentially scanned in repetitive cycles so that information is simultaneously exchanged between the selectively interconnected stations and lines on a time division basis.

Figure 5:
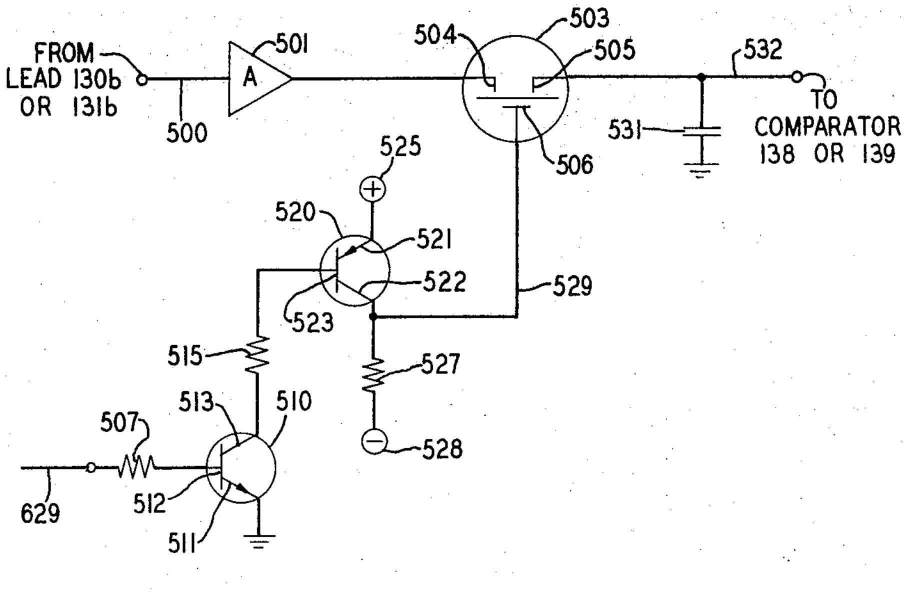
FIG. 5 depicts a sample and hold circuit useful in the embodiment of FIG. 1.

Common buses **124*b* and 126*b* are used to transfer samples of the signals on selected storage capacitors at the beginning of each time slot to sample and hold circuits 134 and 136. A sample and hold circuit is illustrated in FIG. 5. This circuit may be used in either sample and hold circuit 134 or 136. Assume for purposes of description that the circuit of FIG. 5 represents sample and hold circuit 136. In this event, input lead 500 is connected to lead 130*b* which is in turn connected to bus 126*b*. After one of switches 111–1*a* through 111–*na* is closed, one of storage capacitors 108–1 through 108–*n* is connected to bus 126; and a sample signal is sent from control 140 to base 512 of transistor 510 via lead 629 and resistor 507. This sample signal is illustrated on waveform 203 of FIG. 2. The sample signal causes transistor 510 to conduct, whereby the emitter-base diode of transistor 520 is forward-biased and, in accordance with the well-known principles of transistor operation, a positive going signal appears on collector 522. This positive-going signal is applied to gate electrode 506 of insulated-gate field-effect transistor (IGFET) 503 via lead 529. The source-drain path of IGFET 503 is thereby rendered conductive so that a signal present on lead 500 originating from one of storage capacitors 108–1 through 108–*n* may pass through unity gain amplifier 501 and IGFET 503 to capacitor 531 between times $t2$ and $t3$. In this way, the signal sampled from common bus 126*b* is stored. The stored signal is then available on lead 532 which is further connected to comparators 139 and 160. The circuit illustrated in FIG. 5 may also be used as sample and hold circuit 134 so that the sampled signal from bus 124*b* originating from one of storage capacitors 107–1 through 107–*n* is stored and made available to comparators 138 and 160**. It is to be understood that other wellknown types of sample and hold circuitry may be used.

As hereinbefore described, the sample and hold circuits store the sampled signals for the duration of the time slot and the stored signals from circuit 134 are applied to comparators 138 and 160 while the stored signal from circuit 136 is applied to comparators 139 and 160. Common buses **124*a* and 126*a* transfer the signals from the selected storage capacitors to comparators 138 and 139 continuously during the time slot. This arrangement allows the stored sampled signal of one storage capacitor to be compared to the continuously monitored signal from the other storage capacitor. During the signal transfer portion of the time slots, the voltage on each storage capacitor changes in accordance with the signal from current sources 120 through 123 and comparators 138 and 139** detect the times at which the stored sampled signals are equal to the continuously monitored signals. When one of the stored sample signals is equal to the other monitored signal, the signal transfer to the continuously monitored storage capacitor is complete and the current source signal to that capacitor is terminated. In this way, a signal from one storage capacitor may be transferred to the other selected storage capacitor by means of a feed back arrangement which permits the signal on each storage capacitor to be fed back and compared to the signal voltage to be attained, e.g., the sampled stored signal from the other connected storage capacitor.

Figure 2:
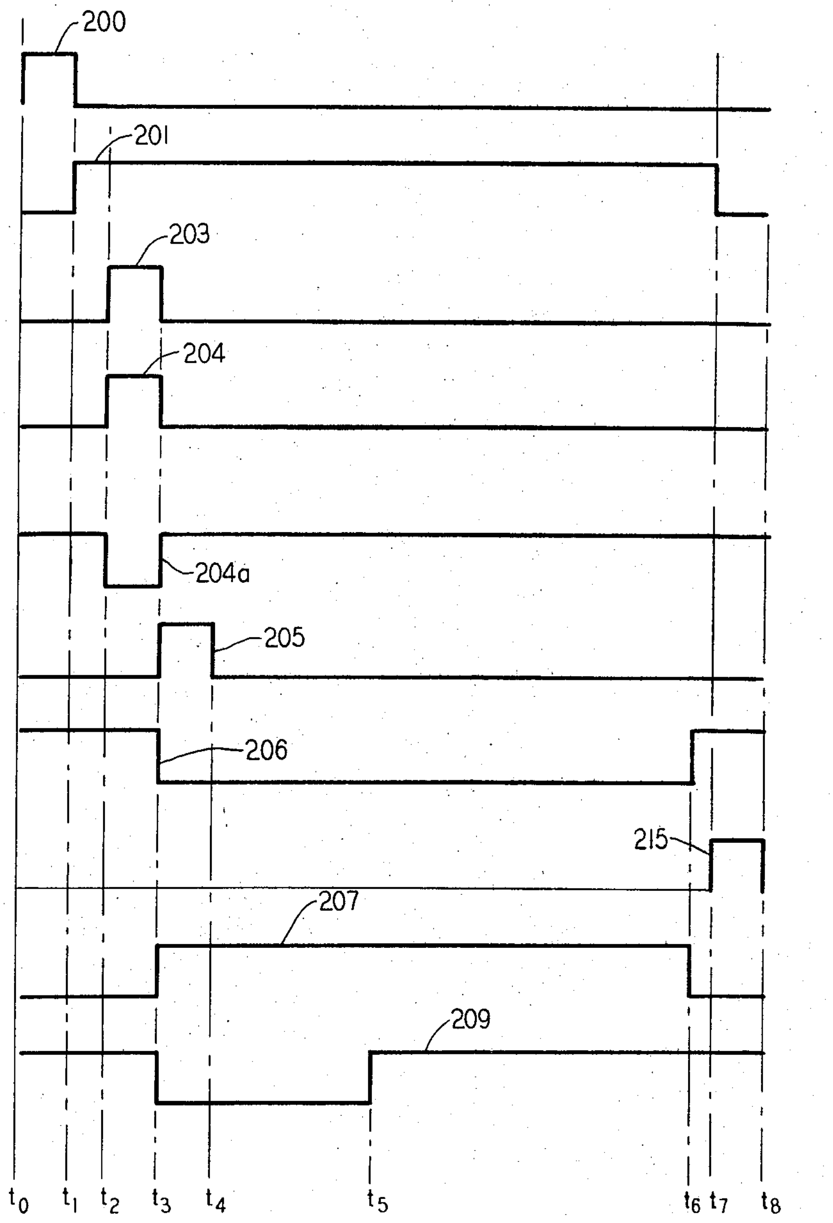
FIG. 2 shows waveforms illustrating the operation of the embodiment depicted in FIG. 1.

Assume for purposes of description that signals are exchanged between station 101–1 and line **103–*n* during time slot illustrated in FIG. 2. The information signal from station 101–1 is applied to filter 102–1 and stored on capacitor 107–1. In like manner, the information signal on line 103–*n* is stored on capacitor 108–*n*. Between times $t_0$ and $t_1$ in the illustrative time slot on FIG. 2, a signal shown on waveform 200 of FIG. 2 is applied from control 140 over lead 620 to memory 150 which signal causes the addresses of station 101–1 and line 103–*n* to be transferred to control 140 and decoded therein. In response to the decoded signals, a signal $A_1$ is applied to gates 110–1*a* and 110–1*b*** and a signal B*n* is applied to gates **111–*na* and 111–*nb*. When gate 110–1*b* is opened, the voltage on capacitor 107–1 is transmitted to bus 124*b* and when gate 111– *nb* is opened, the voltage on capacitor 108–*n* is transmitted to bus 127*b*. Bus 124*b* is connected to sample and hold circuit 134 via lead 131*b* and bus 126*b* is connected to sample and hold circuit 136 via lead 130*b***.

The storage capacitor (531) of sample and hold circuit 134 receives the sampled signal from capacitor 107–1 between times $t_2$ and $t_3$ under control of the sampling signal from control 140 applied on lead 629. Circuit 134 stores the sampled signal for the remainder of the time slot. The storage capacitor of sample and hold circuit 136 receives the sampled signal from capacitor **108–*n* between times $t_2$ and $t_3$. The sampled signal is then stored in circuit 136** for the remainder of the time slot. The time period between $t_2$ and $t_3$ is selected to allow complete signal sample transfers to the sample and hold circuits.

The outputs of sample and hold circuits 134 and 136 are applied to comparator 160 which comparator may comprise a differential amplifier well known in the art. Comparator 160 is responsive to the polarity of the stored voltage difference between the stored sample signals from circuits 134 and 136. The output of comparator 160 is applied to the D input of flip-flop 162 to determine the state of flip-flop 162. Flip-flop 162 is a well-known D type flip-flop and may be the Texas Instrument type SN 7474. Where the output of sample and hold circuit 134 is more positive than the output of sample and hold circuit 136, flip-flop 162 is placed in the zero state upon receipt of a positive going edge of the select pulse (waveform **204*a*) at input T so that negative current source 122 and positive current source 123 will be enabled from gates 173 and 177 just after $t_3$. The select signal is applied from control 140 to the T input of flip-flop 162 on lead 628. Where the output of sample and hold circuit 136 is more positive than the output of sample and hold circuit 134 is more positive than the output of sample and hold circuit 134, flip-flop 162 is placed in the one state so that gates 175 and 179 will be alerted to enable current sources 120 and 121**.

The select signal from control 140 in conjunction with the signal from comparator 160 allows flip-flop 162 to assume the state determined by the output of comparator 160. A start signal from control 140 is also applied via lead 631 to flip-flops 168 and 170 to set these flip-flops to their one states at $t_3$. The high one outputs of flip-flops 168 and 170 are then applied via leads 186 and 189 to gates 173 and 175 and gates 177 and 179, respectively, so that the current sources may be enabled in accordance with the state of flip-flop 162. The start signal is shown on waveform 205 on FIG. 2 and is applied between times $t_3$ and $t_4$. At time $t_3$, appropriate current sources are enabled to apply current signals to common buses **124*b* and 126*b***.

Assume that the stored sample signal in circuit 134 is more positive than the stored sample signal in circuit 136. In this event, at time $t_3$, the inputs to gates 173 and 177 from flip-flops 168, 170 and 162 are high, whereby these gates are opened and current sources 122 and 123 are enabled. Negative current source 122 removes charge from capacitor 107–1 via sampling gate **110–1*b* and common bus 124*b*. The stored sample signal derived from capacitor 108–*n* is at this time applied to comparator 139, together with the signal on capacitor 107–1, which signal is applied to comparator 139 via gate 110–1*a* and common bus 124*a*. The signal voltage on capacitor 107–1 is reduced due to the removal of charge therefrom through the operation of negative current source 122 between times $t_3$ and $t_5$. The negative current source output is shown in waveform 209 on FIG. 2**.

At time $t_5$, the signal voltage on capacitor 107–1 is equal to the stored sample signal from circuit 136 so that the signal transfer from capacitor **108–*n* to capacitor 107–1 is completed and negative current source 122 should be disabled. This is done by resetting flip-flop 168 via Exclusive Or Circuit 169. At time $t_3$, the zero output of flip-flop 162 is high, and this high signal is applied to Exclusive Or Circuit 169 via lead 184. The output of comparator 139 becomes low because the stored sample signal from circuit 136 and the monitored signal from bus 124*a* are equal. The combination of a high output on lead 184, and a low output on lead 183 enables gate 164 which in turn resets flip-flop 168. The one output of flip-flop 168 then becomes low so that gate 173 is disabled and current source 122** is also disabled.

Between times $t_3$ and $t_6$ gate 177 is opened whereby positive current source 123 is enabled. The constant current signal from positive current source 123 is applied to capacitor **108–*n* via common bus 126*b* and gate 111–*nb*. The positive constant current from source 123 is illustrated on waveform 207 of FIG. 2. At time $t_6$, the signal voltage on storage capacitor 108–*n* has increased so that it is equal to the signal from sample and hold circuit 134 whereby comparator 138 reverses state and current source 123** is disabled.

The termination of the signal transfer to capacitor **108–*n* is controlled by comparator 138 and flip-flop 162 via Exclusive Or Gate 166. Comparator 138 operates to compare the stored sample output of sample and hold circuit 134, which is derived from capacitor 107–1, to the continuously monitored output of capacitor 108–*n*. Since at time $t_3$, the output of storage capacitor 108–*n* is less positive than that of storage capacitor 107–1, the output of comparator 138 on lead 180 is low. The one output of flip-flop 162 at time $t_3$ is also low because this flip-flop has been placed in the zero state. When the signal voltage on storage capacitor 108–*n* increases so that it is equal to the signal from sample and hold circuit 134, comparator 138 reverses state, whereby a high signal is applied to Exclusive Or Gate 166 via lead 180 while a low signal is applied to Exclusive Or Gate 166 via lead 181. This combination of signals applied to Exclusive Or Gate 166 opens gate 166 so that flip-flop 170 is reset. The resetting of flip-flop 170 disables gate 177, which in turn disables positive current source 123. Thus at time $t_6$ on FIG. 2, the signal transfer to storage capacitor 108**–*n* is completed.

A signal indicating that the signal transfer to both storage capacitor 107–1 and **108–*n* have been completed is sent to control 140 via Or gate 196 and lead 633. This complete signal on lead 633 is utilized in control 140 to control closing of sampling gates 110–1*a*, 110–1*b*, 111–*na* and 111–*nb* and to initiate the next time slot. The complete signal is also used to generate a quench signal (waveform 216) that is applied to gates 113*a*, 113*b*, 114*a* and 114*b* between $t_7$ and $t_8$ to remove any residual voltage remaining on buses 124*a*, 124*b*, 126*a* and 126*b*** at the end of the time slot.

Figure 6:
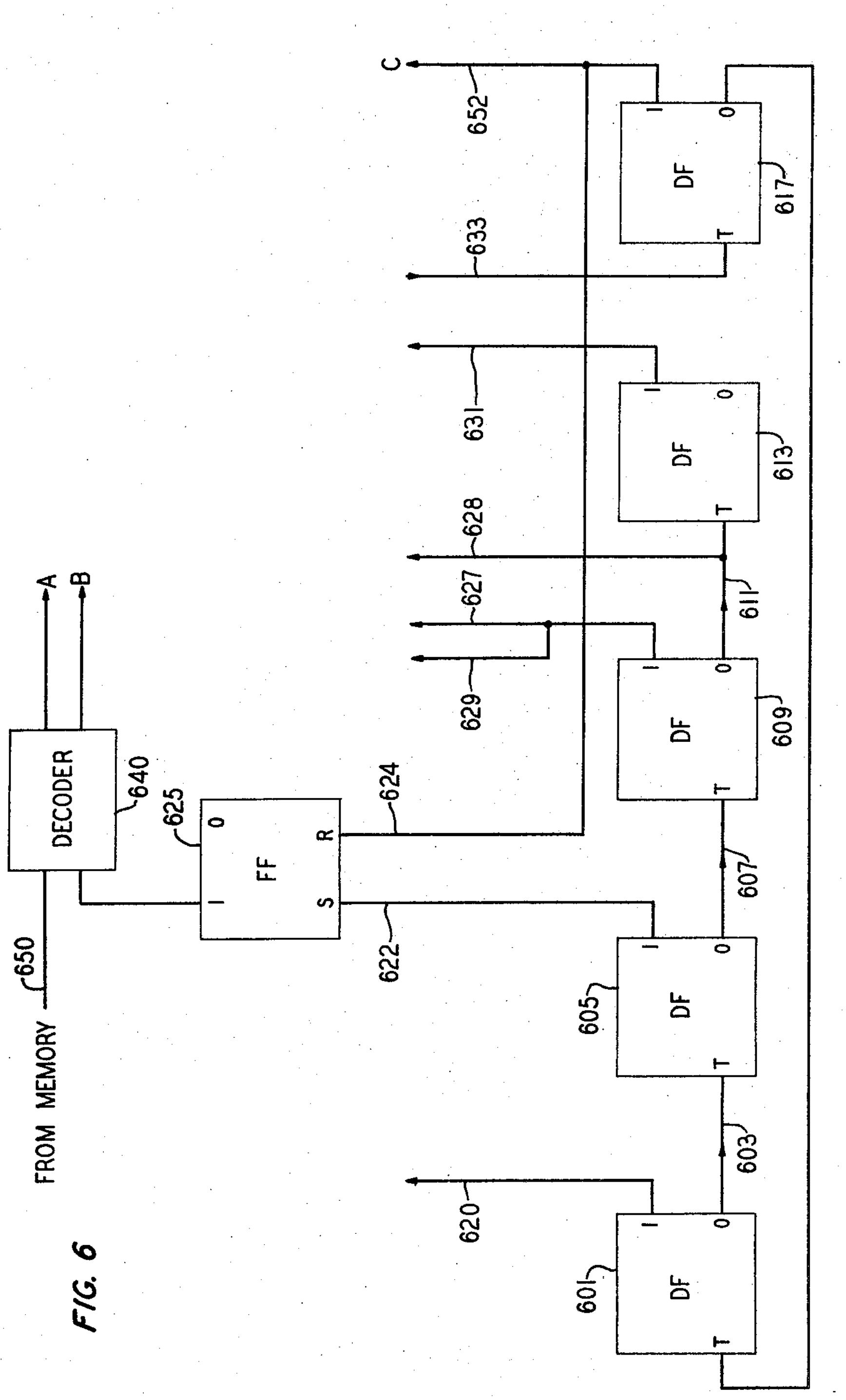
FIG. 6 depicts a control circuit arrangement useful in the embodiment of FIG. 1.

One type of circuit that may be used in control circuit 140 is illustrated on FIG. 6. The control circuit of FIG. 6 comprises a plurality of delay flops. It is to be understood that other types of control arrangements well known in the art may also be used. Each of the delay flops on FIG. 6 has a T input and a zero and one output. In the quiescent state, the one output of a delay flop is a low logic level and the zero output of a delay flop is a high logic level. When a positive going transition is applied to the T input of a delay flop, the one output changes to a high logic level and the zero output changes to a low logic level for a time interval determined by the circuit parameters of the delay flop. In this way, signals are generated to control the operation of the embodiment of my invention shown in FIG. 1.

At the beginning of a time slot such as the one illustrated in FIG. 2, a positive transition is applied to delay flop 601 from the zero output of delay flop 617. This positive transition enables delay flop 601 so that the one output of delay flop 601 becomes a high level signal. This high level signal on lead 620, illustrated in waveform 200, is applied to memory 150 as described hereinafter to select a station and a line designation from memory 150.

At time $t_1$, delay flop 601 reverts to its quiescent state and a positive transition is applied to the T input of delay flop 605 via lead 603 so that delay flop 605 is enabled. When delay flop 605 is enabled, a signal is sent to flip-flop 625 via lead 622 whereby flip-flop 625 is set. The one output of flip-flop 625 is connected to decoder 640 which decoder operates to decode station and line addresses from memory 150 sent via cable 650. When decoder 640 is thus enabled, signals are sent via cables A and B from the output of decoder 640 to open the gates associated with the selected station and the selected line. Where station 101–1 and line **103–*n* are selected an $A_1$ signal from the decoder sent via cable A opens gates 110–1*a* and 110–1*b* and a $B_n$ signal sent via cable B opens gates 111–*na* and 111–*nb*. The output of flip-flop 625 is shown in waveform 201**.

Delay flop 605 reverts to its quiescent state at time $t_2$ so that delay flop 609 is enabled via a positive transition on lead 607. Delay flop 609 provides a positive going signal on lead 629 which is sent to the sample and hold circuits such as the one illustrated in FIG. 5 to permit the transfer of the signal stored on the selected station and line storage capacitors to the sample and hold circuits as hereinbefore described. The sample signal is illustrated in waveform 203 and occurs between times $t_2$ and $t_3$. A negative going signal illustrated in waveform **204*a* is also generated when delay flop 609 is enabled and this signal is sent via lead 628 to the T input of flip-flop 162 which flip-flop is used to control the enabling of the current sources shown in FIG. 1**.

When delay flop 609 reverts to its quiescent state, delay flop 613 is enabled and the start signal (waveform 205) from the one output thereof is sent to flip-flops 168 and 170 via lead 631 between times $t_3$ and $t_4$. As hereinbefore described, flip-flops 168 and 170 are used to control the enabling of the current sources.

When the current transfers to capacitor 107–1 and 108–n are both completed at time $t_6$, flip-flops 168 and 170 are reset and the signals from the zero outputs of these flip-flops are applied to gate 196 which is then opened so that a positive going signal is applied to the T input of delay flop 617 via lead 633. This signal causes delay flop 617 to be enabled whereby a quench signal C is applied from the one output of delay flop 617 via lead 652 to gates 113a, 113b, 114a and 114b to remove any residual voltages remaining on buses 124a, 124b, 126a and 126b. The zero output of delay flop 617 is also connected to the T input of delay flop 601 so that the termination of the quench signal illustrated on waveform 215 causes the next time slot to begin.

Figure 4:
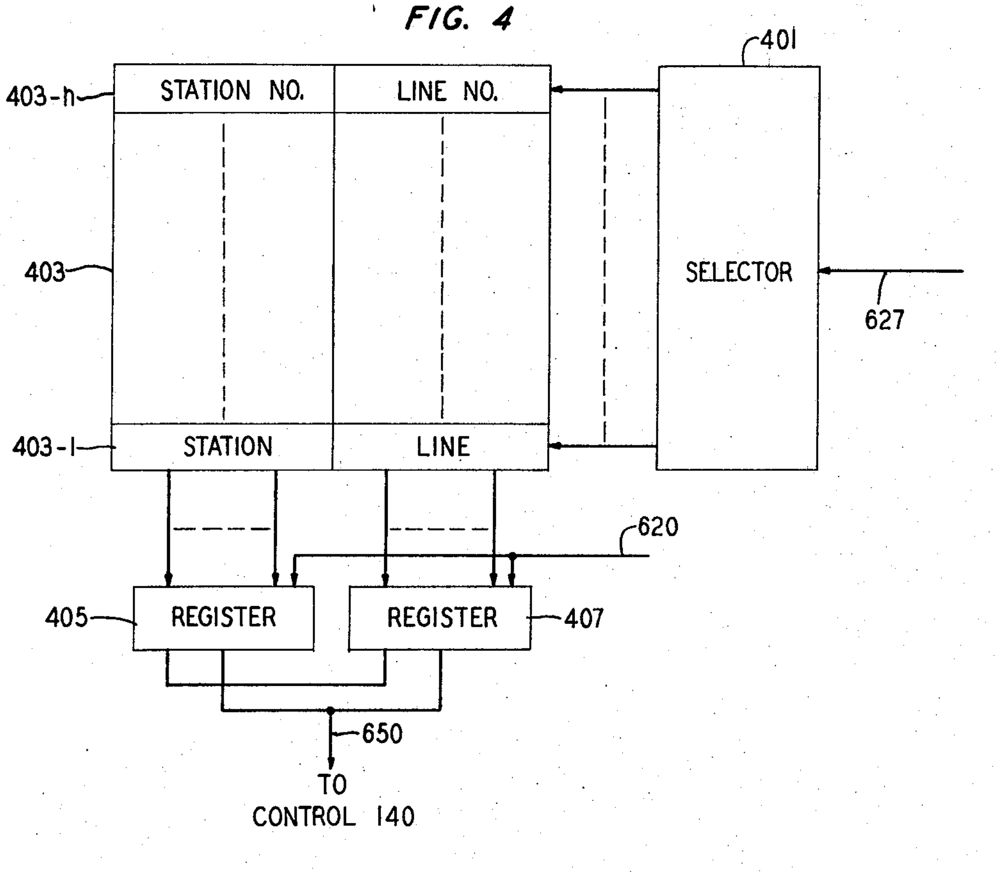
FIG. 4 illustrates a selection memory circuit useful in the embodiment of FIG. 1.

Memory 150 is shown in FIG. 4 and comprises a plurality of memory cells 403–1 through 403–n, a station register 405, a line register 407, and a memory cell selector 401. Each of the memory cells contains a station and line address. These cells are addressed sequentially so that a selected station and line may be interconnected in each time slot. A signal from delay flop 601, illustrated in waveform 200, causes the previously selected station and line address to be transferred to registers 405 and 407. This signal is applied via lead 620. The outputs of registers 405 and 407 are then sent to decoder 640 of control 140 via cable 650. When delay flop 609 is enabled, during the time slot, a signal is sent via lead 627 from the one output of delay flop 609 to selector 401 which signal causes the next memory cell in the sequence to be selected. The contents of this next memory cell containing the next successive station and line addresses will then be transferred to registers 405 and 407 at the beginning of the next successive time slot.

Figure 3A:
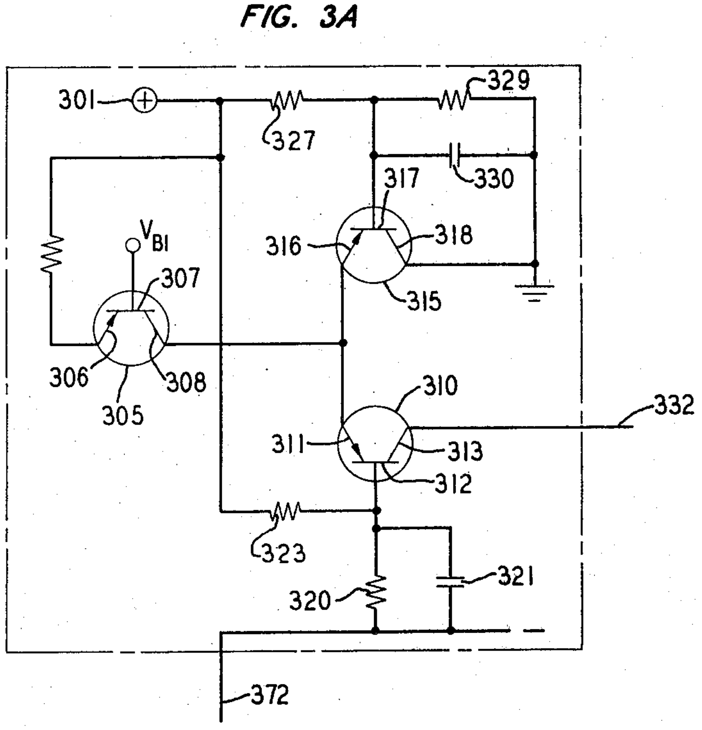
FIG. 3A and 3B illustrate current source arrangements useful in the embodiments of FIG. 1.

The circuit shown in FIG. 3A may be incorporated in positive current source 120 or positive current source 123 of FIG. 1 to provide the positive constant current required for energy transferred between the selectively connected capacitors. It is to be understood that the other constant current circuit arrangements known in the art may also be used. Referring to FIG. 3A, emitter 306 of transistor 305 receives a predetermined current from the source including voltage source 301 and resistor 303. Base 307 is biased at voltage $V_{B1}$ so that transistor 305 is conducting with its collector base diode reverse-biased. In this mode of operation, transistor 305 provides a constant current which normally flows into emitter 316 of transistor 315 since transistor 316 is normally turned on by means of the divider network connected to base 317. This divider network comprises resistors 327 and 329 which resistors are arranged so that the emitter-base diode of transistor 315 is forward-biased. Capacitor 330 provides a bypass path to filter noise appearing on base 317.

Lead 372 is connected to one of gates 175 and 177 so that a negative signal from one of gates 175 and 177 may be applied to base 312 of transistor 310 via the coupling network including resistor 320, capacitor 321, and resistor 323. This network is arranged to normally reverse-bias base 312 in the absence of a negative going signal on lead 372. When a negative going signal is applied to lead 372 in response to the operation of one of gates 175 and 177, transistor 310 is saturated and the constant current from collector 308 is applied to lead 332 via the emitter-collector path of transistor 310. When transistor 310 conducts, emitter 316 of transistor 315 is reverse-biased and the current from transistor 305 is then applied to lead 332. This arrangement permits a positive constant current from a high impedance source to be applied to the selected one of buses 124b or 126b.

Figure 3B:
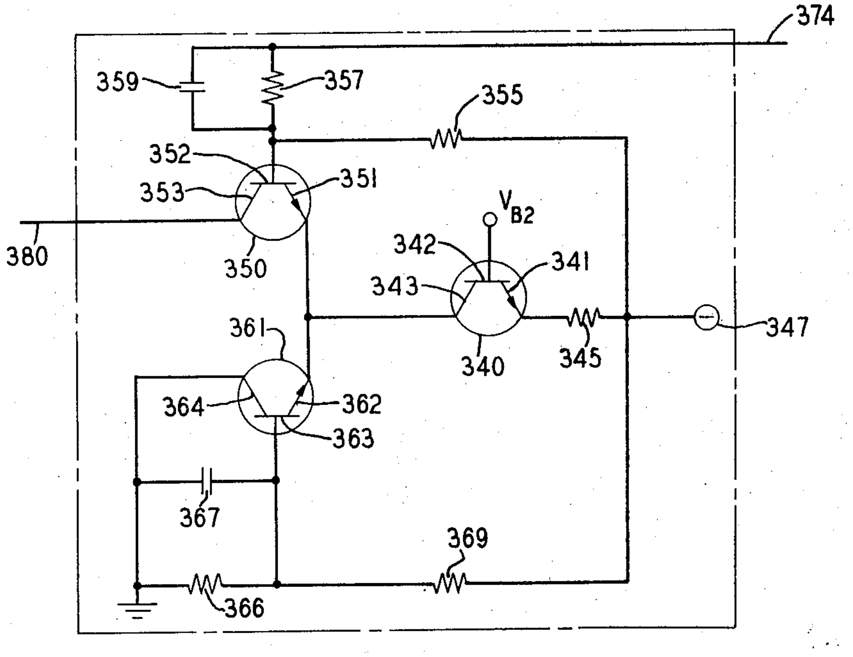

A negative constant current source is shown in FIG. 3B. The arrangement therein comprises transistors 361, 350 and 340. Negative voltage source 347 and resistor 345 provides a negative current for emitter 341 of transistor 340. The bias voltage $V_{B2}$ on base 342 causes transistor 340 to conduct so that the collector-base diode thereof is reverse-biased. This provides a constant current to normally conducting transistor 361. The base network arrangement including negative source 347, resistors 369 and 366, and capacitor 367 forward-biases the base emitter diode of transistor 361 so that this transistor is saturated. This leaves transistor 350 in a nonconducting state. When a positive going signal is applied to lead 374 from one of gates 173 and 179, base 352 is made positive through the network including resistors 357, 355 and capacitor 359. The base-emitter diode of transistor 350 then conducts and the current from collector 343 is applied through the emitter collector path of transistor 350 to lead 380. With transistor 350 conducting, transistor 361 is cut off. In this way, a high impedance negative current source is provided. Where the circuits of FIG. 3A and 3B are used in current sources 121 and 123, leads 332 and 380 are connected to bus 126b whereby a positive current source and a negative current are provided for storage capacitors 108–1 through 108–n. Similarly, a positive and a negative current source are provided for bus 124b.

What is claimed is:

1. A time division switching system comprising a plurality of storage devices, means operative in a distinct time slot of a plurality of time slots occurring in repetitive cycles for sampling the signal on a selected first storage device and for sampling the signal on a selected second storage device, means for monitoring the signal on each selected first and second storage devices during said distinct time slot, means responsive to the polarity of the difference between the sampled signals on said selected first and second storage devices for applying one of first and second type signals to said selected first storage device and for applying the other of said first and second type signals to said selected second storage device, first means connected to said signal applying means responsive to the difference between said selected second storage device sampled signal and said selected first storage device monitored signal for terminating the one of said first and second type signals applied to said first storage device, and second means connected to said signal applying means responsive to the difference between said first storage device sampled signal and said second storage device monitored signal for terminating the other of said first and second type signals applied to said second storage device.

2. A time division switching system according to claim 1 wherein said plurality of storage devices comprises first and second groups of storage devices, said selected first storage device being selected from said first group of storage devices and said selected second storage device being selected from said second group of storage devices.

3. A time division switching system according to claim 2 wherein said means for sampling the signal on said selected first storage device comprises a first common bus and means for selectively connecting said selected first storage device to said first common bus during said distinct time slot, said means for sampling the signal on said selected second storage device comprises a second common bus and means for selectively connecting said selected second storage device to said second common bus during said distinct time slot, said means for monitoring the signal on said selected first storage device comprises a third common bus and means for selectively connecting said selected first storage device to said third common bus during said distinct time slot, said means for monitoring the signal on said selected second storage device comprises a fourth common bus and means for selectively connecting said selected second storage device to said fourth common bus during said distinct time slot.

4. A time division switching system according to claim 3 wherein said selected first storage device signal sampling means further comprises means connected to said first common bus for storing said sampled signal from said selected first storage device for the duration of said distinct time slot and said selected second storage device signal sampling means further comprises means connected to said second common bus for storing said sampled signal from said selected second storage device for the duration of said distinct time slot.

5. A time division switching system according to claim 3 wherein said means for applying one of said first and second type signals comprises first means connected to said first bus for generating a first polarity signal, second means connected to said first bus for generating a second polarity signal, means for selectively enabling one of said first and second generating means in said distinct time slot, said means for applying the other of said first and second type signals comprises third means connected to said second bus for generating a first polarity signal, fourth means connected to said second bus for generating a second polarity signal and means for selectively enabling the one of said third and fourth generating means in said distinct time slot.

6. A time division switching system according to claim 5 wherein said first signal terminating means comprises means connected to said first and second generating means responsive to said selected second storage device sample signal being equal to said selected first storage device monitored signal for disabling the enabled one of said first and second generating means, said second signal terminating means comprises means connected to said third and fourth generating means responsive to said first storage device sample signal being equal to said second storage device monitored signal for disabling the enabled one of said third and fourth generating means.

7. In a time division switching system wherein a plurality of time slots occur in repetitive cycles, the combination comprising a plurality of storage devices, means operative during a first interval of a distinct time slot comprising means for storing a sample of the signal on each of a selected pair of storage devices, and means for detecting the polarity of the difference between said stored samples, means operative in a second interval of said distinct time slot comprising means for monitoring the signal present on each of said selected storage device pair, means responsive to said detected polarity for generating first and second polarity signals, means for applying one of said first and second polarity signals to one of said selected pair of storage devices, means responsive to said detected polarity for applying the other of said first and second polarity signals to the other of said selected storage device pair, means for comparing the monitored signal of each one of said selected pair of storage devices to the stored sample of the other of said selected storage device pair, means connected between said comparing means and said one storage device signal applying means responsive to a signal from said comparing means indicating said other storage device stored sample is equal to said one storage device monitored signal for disabling said one storage device signal applying means.

8. A time division switching system comprising a plurality of storage devices, a plurality of time slots occurring in repetitive cycles, means operative in a distinct time slot of the plurality of time slots occurring in repetitive cycles for selecting a first and a second storage device from said plurality of storage devices, means for sampling the signal on the first storage device and for sampling the signal on the second storage device at the beginning of said distinct time slot, means connected to said sampling means for detecting the polarity of the difference between the sampled signal from the first storage device and the sampled signal from the second storage device, means connected to said first storage device for generating first and second signals, means responsive to said difference polarity from said detecting means for enabling one of said first and second signal generating means, means connected to said first storage device and to said signal generating means for controlling the duration of said applied signal comprising means for comparing the signal on said first storage device with said second storage device sampled signal and means responsive to the output of said comparing means for disabling said enabled one of said first and second signal generating means.

9. A time division switching system according to claim 8 wherein said first signal generating means comprises means for generating a constant current signal of one polarity and said second signal generating means comprises means for generating a constant current of the opposite polarity.

10. A time division switching system according to claim 9 wherein said comparing means comprises means responsive to said signal on said first storage device being equal to said second storage device sampled signal for producing a third signal and means for applying said third signal to said disabling means, said disabling means being responsive to said third signal to disable said enabled one of said first and second signal generating means.

11. In a time division switching system wherein a plurality of time slots occur in repetitive cycles the combination comprising a plurality of stations a plurality of trunks; a storage device coupled to each station; a storage device coupled to each trunk; first, second, third and fourth common buses; first gating means connected between each station coupled storage device and said first and second buses; second gating means connected between each trunk coupled storage device and said third and fourth buses; means for enabling said first gating means to connect a selected station coupled storage device to said first and second buses and for enabling said second gating means to connect a selected trunk coupled storage device to said third and fourth buses in a distinct time slot; means operative in a first portion of said distinct time slot comprising means connected to said first common bus for storing a sample of the signal on said selected station coupled storage device, means connected to said third bus for storing a sample of the signal on said selected trunk coupled storage device, and means for detecting the polarity of the stored sampled signal difference between said selected station coupled storage device and said selected trunk storage device; means operative in a second portion of said distinct time slot comprising first and second polarity signal generating means, means responsive to said detected polarity difference for enabling one of said first and second polarity signal generating means to apply a signal to said first bus and for enabling the other of said first and second polarity signal generating means to apply a signal to said second bus, means connected to said second bus for continuously monitoring the signal on said station coupled storage device, means connected to said fourth bus for continuously monitoring the signal on said trunk coupled storage device, means connected to said signal generating means responsive to the difference between said stored sampled signal from said trunk coupled storage device and said continuously monitored signal from said station coupled storage device for disabling said one of said first and second polarity signal generating means, and means connected to said generating means responsive to the difference between said stored signal from said station coupled storage device and said continuously monitored signal from said trunk coupled storage device for disabling the other of said first and second polarity signal generating means.

12. In a time division switching system wherein a plurality of time slots occur in repetitive cycles the combination comprising a first and a second storage device, means operative in a distinct time slot for sampling the signals on said storage devices, means for comparing said sampled signals, means for connecting constant current sources to said first and second storage devices dependent upon the comparison of said sampled signals, and means for terminating the connection of said constant current sources to said first and second storage devices comprising means for storing said sampled signals, means for monitoring the signals on said storage devices when said constant current sources are connected thereto, and means for comparing said stored sampled signals and said monitored signals.

13. In a time division switching system, the combination in accordance with claim 12 wherein said first storage device is connected to a first and a second bus, said second storage device is connected to a third and a fourth bus, said means for comparing said sampled signals includes a first comparator connected to said first and third buses, and said means for comparing said stored signals and said monitored signals includes a second comparator connected to said first and fourth buses and a third comparator connected to said second and third buses.

14. In a time division switching system, the combination in accordance with claim 13 wherein said means for terminating the connection of said constant current sources to said first and second storage devices further comprises memory circuit means controlled by said first, second, and third comparators.

15. In a time division switching system wherein a plurality of time slots occur in repetitive cycles, the combination comprising a first and a second storage device, a plurality of constant current sources, means for connecting said first and said second storage devices to particular ones of said sources dependent upon the polarity difference of sampled signals on said first and second storage devices in a distinct time slot, and means for determining the time duration of the connection of said sources to said storage devices, said determining means including means for comparing the instantaneous signal on each of said storage devices with the priorly sampled signals on said storage devices.

* * * * *